United States Patent [19]

Sirand

[11] Patent Number: 5,060,629

[45] Date of Patent: Oct. 29, 1991

[54] HEATING APPARATUS OF THE INFRARED TYPE

[75] Inventor: Joseph Sirand, Laplume, France

[73] Assignee: Centre D'Etude et de Realisation D'Equipements et de Materiel (C.E.R.E.M.), Laplume, France

[21] Appl. No.: 475,642

[22] Filed: Feb. 6, 1990

[30] Foreign Application Priority Data

Feb. 7, 1989 [FR] France ................... 89 01720

[51] Int. Cl.$^5$ ............................................. F24C 3/04
[52] U.S. Cl. ................................... 126/92 B; 119/32; 431/329
[58] Field of Search .............. 126/92 B, 92 R, 92 AC; 119/32; 431/329

[56] References Cited

U.S. PATENT DOCUMENTS

| | | | |
|---|---|---|---|
| 2,240,571 | 5/1941 | Olson et al. | 119/32 |
| 2,985,137 | 5/1961 | Horne | 126/92 B |
| 4,452,225 | 6/1984 | Plant | 126/92 B |
| 4,719,874 | 1/1988 | Maurice | 126/92 B |

*Primary Examiner*—Carroll B. Dority
*Attorney, Agent, or Firm*—Harold H. Dutton, Jr.

[57] ABSTRACT

The invention relates to a heating apparatus of the infrared type, particularly intended for the agricultural industry for the directionally downward heating of breeder buildings. This apparatus comprises primarily, arranged on the interior of a reflective dome (1) secured on a gas/air mixture feed conduit (3), a primary combustion chamber of a conical shape, comprising a base wall, secured to the end of the feed conduit (3), and a conical wall (13) of a perforate conductive heat resistant material, and a diffusion pre-chamber, arranged in the primary combustion chamber (8) and comprising a wall (16) of a heat resistant material, perforated with holes having a maximum opening dimension of less than 1.5 mm, said wall having a conical shape, pointed downwardly, with an apex angle of less than that of the conical wall (13) of the primary chamber.

13 Claims, 4 Drawing Sheets

HEATING APPARATUS OF THE INFRARED TYPE

This invention relates to a heating apparatus of the infrared type, and applies in particular to a heating apparatus for the agricultural industry for directional heating toward the ground in breeder buildings.

BACKGROUND AND OBJECTS OF THE INVENTION

Heating apparatus of the infrared type are actually used at the present time and are employed for diverse purposes, such as the softening of vehicular roadways, as described in European patent EP-A-0035797, or the heating of small spaces by means of a portable heating apparatus, as described in U.S. Pat. No. 4,452,225. Such apparatus conceived for producing a given quantity of calories at high temperature are particularly suited to their specific application.

Infrared type heating apparatus are also used at the present time for the heating of breeder buildings in the agricultural field, an application for which very specialized apparatus have had to be developed. In effect, the heating of breeder buildings imposes technical constraints which cannot be satisfactorily addressed by the apparatus mentioned above: the production of heat controllable as a function of the zootechnical needs, installation in very dusty atmospheres .... To respond to these needs, two principal types of apparatus have been used.

The first type of apparatus comprises primarily a conduit for feeding a gas/air mixture, comprising an air inlet provided with a filter, and a gas injector. This conduit empties into a cylindrical chamber with a refractory grill arranged horizontally below a reflector. In addition, a flame arresting grill is arranged at the inlet of the cylindrical chamber. The control of the heat production is obtained by varying the flow of gas fed to this apparatus which is intended to operate over a very large range of heat output. However, the use of such apparatus has revealed several disadvantages.

Firstly, when the apparatus operates at full power, the chattering noise reflected by the flame is very significant and only abates after a drop in output of about 50%.

Further, the horizontal position of the flame in the torch directs the radiant heat, 50% toward the upper surface of the cylinder and the infrared emission produced by this upper half of the cylinder radiates toward the bottom of the reflector, instead of being directed directly toward the exterior of the reflector. Moreover, when the output diminishes, the flame from the blowpipe preferably touches the upper half of the horizontal cylinder, that is the surface not directed toward the outside of the reflector, and the lower half of the cylinder becomes less and less radiant. Then, if the output diminishes still further, only the upper part of the cylinder near the output tube of the small flame remaining receives a quantity of residual heat which loses, because of the conduction to the entire cylinder, the temperature level necessary for a good luminous infrared emission, even residual. This latter disadvantage is a drawback in the case of certain species of poultry and game birds, which require at the same time as a minimum of radiation, a light reference point to protect them from a gregarious behavior leading to suffocation of a number of them, resulting from stacking up on each other in the darkness.

Finally, this apparatus requires the presence of a filter interposed on the air inlet of the feed conduits, in order to prevent the flame arresting grill from becoming clogged by the aspirated dust. This filter requires a very frequent maintenance in order to avoid its clogging.

The second type of apparatus, described in French patent No. 2,620,799 in the name of the applicant, comes from a different technical field and comprises primarily a reflector in which is integrated a radiant plate of ceramic, associated with a mixing chamber. Such an apparatus offers a very good reliability of operation over a large range of power, and does not present the deficiencies of the apparatus described above. However, this reliability of operation is obtained at the price of a much more sophisticated technology (a pilot light circuit . . . ) than that of the aforementioned apparatus, and as a result an increase of the cost of this type of heating apparatus.

The present invention seeks to overcome the disadvantages of infrared type heating apparatus used for heating of breeder buildings and has as a principal object to provide a heating apparatus of a very simply construction, operating over a very large range of power output, and having, moreover, the peculiarity of remaining emissive of infrared radiation regardless of the level of power.

Another object is to provide a heating apparatus operating without a filter in the air inlet.

Another object of the invention is to provide a heating apparatus permitting obtaining, at the ground and at all levels, an ideal radiation.

Another object of the invention is to provide an easily maintainable heating apparatus, cleanable with water both internally and externally.

Another object of the invention is to provide a heating apparatus which does not generate chattering noise during its operation.

DESCRIPTION OF THE INVENTION

To this end, the invention provides a heating apparatus of the infrared type, particularly intended for agricultural use for the directional heating toward the ground of breeder buildings, characterized in that it comprises in combination:

a feed conduit provided with an opening for the inlet of air, a safety valve provided with an inlet adapted to be connected to means for feeding gas and an outlet connected to the feed conduit by a gas injection conduit, said valve being provided with a member for holding its closure in an open position, a member controlled by a temperature detector, and an opening member, in particular a manually operable button, permitting causing the opening of said closure, a reflective dome provided with an inlet opening for a gas/air mixture, secured to the feed conduit at one end thereof, and arranged essentially concentrically with respect to said conduit, a first chamber, termed a primary combustion chamber, having a conical shape pointed downwardly, and arranged on the interior of the dome essentially concentrically with respect thereto, said chamber comprising a wall, termed a lower wall, fastened toward the extremity of the feed conduit and provided with a mixture inlet opening, and a conical wall of a perforated, heat resistant, conductive material, provided with a base fastened to the base wall, a second chamber, called a diffusion pre-chamber, arranged in the primary combustion chamber and comprising a wall of a heat resistant material, perforated with holes having a maximum dimension of the openings less than 1.5 mm, said wall having a conical shape pointed downwardly, with a peak angle less than that of the conical wall of the primary chamber, and comprising a base of a diameter slightly greater than that of the feed conduit, fastened to the refractory base wall essentially concentrically with respect to this conduit, sealing means arranged at the level of the base of the conical wall of the diffusion pre-chamber and adapted to prevent any passage of the combustion mixture into the primary combustion chamber from the interior of said diffusion pre-chamber.

Such a heating apparatus presents the great advantage of remaining emissive of infrared radiation regardless of the level of output.

In effect, at high output, the diffusion pre-chamber, because of its perforations, assures the projection of the gas/air mixture against the conical wall of the primary chamber which becomes heated to red heat. Further, due to this diffusion pre-chamber which assures the decompression of this mixture and its distribution, the apparatus operates without causing any chattering noise.

Further, if the output diminishes, and particularly at low output, the diffusion pre-chamber relays the infrared emission because the projection force of the mixture flow toward the combustion decreases, this combustion becomes weaker between the primary combustion chamber and the diffusion pre-chamber and is brought closer to the latter. This diffusion pre-chamber then becomes the infrared and luminous emitter at the lower level.

In addition, regardless of the level of operation, low or high output, the respective shapes of the dome and the walls of the primary combustion chamber and diffusion pre-chamber permit obtaining at the ground an ideal radiation in the nature of concentric circles.

During reduced output, the combustion of the gas/air mixture is always carried out on the exterior of the diffusion pre-chamber, but a portion of the surface of the conical wall of this pre-chamber remains at the red hot level. As a result, the little dust aspirated at the low level is pyriollized. Moreover, the presence of this point of light has the advantage of protecting the animals against their gregarious behavior which forces them to be stacked up on each other until suffocation of number of them would occur in the darkness.

Additionally, the limited size of the perforations of the conical wall of the diffusion pre-chamber, and the seal means, are adapted such that this conical wall assures an anti-return function for the flames and prevents, at low levels and at reduced levels, the combustion between the primary chamber and the pre-chamber from communicating its flame to the non-burning gas/air mixture on the interior of this pre-chamber, due to an elevation of the temperature above its point of oxidation. Moreover, such a combustion would prevent a restarting of the combustion on the interior of the primary combustion chamber.

This characteristic permits carrying out the operation of the apparatus with complete safety without the need for the conventional presence of a circular flame-arresting grill plate at the output of the feed conduit. This particularity, associated with the fact that aspirated dust is pyrolized regardless of the power level, as explained above, makes unnecessary the presence of a filter at the air intake and permits cleaning the apparatus with water both internally and externally.

The base refractory wall which participates in the radiation of the heat downwardly, may comprise the bottom plate of the dome. However, this base wall will preferably be fastened to the end of the feed conduit in such a manner as to define with the dome a space for the circulation of burning gas and secondary air, this dome being provided with an evacuation opening for these burning gases and hot air.

According to another characteristic of the invention, the ratio between the angles at the top of the respective conical walls of the primary radiation chamber and the diffusion prechamber is essentially between 3.5 and 4.5, and said conical walls have an essentially identical height.

These dimensional characteristics of the respective conical walls of the diffusion pre-chamber and the primary combustion chamber, are adapted such that the flow of the mixture is projected on the radiant conical wall of the primary combustion chamber, according to an average resultant orthogonal to the surface of this conical wall, these resultants being distributed over this surface. For this reason, this conical wall is uniformly maintained at red heat and provides an ideal infrared radiation.

DESCRIPTION OF THE DRAWINGS

Other characteristics, objects and advantages of the invention will become apparent from the detailed description which follows, with reference to the accompanying drawings which show one embodiment of the heating apparatus as well as two preferred embodiments of control valves provided for this apparatus. In these drawings which form an integral part of the present description.

DESCRIPTION OF PREFERRED EMBODIMENTS

Figure 1:
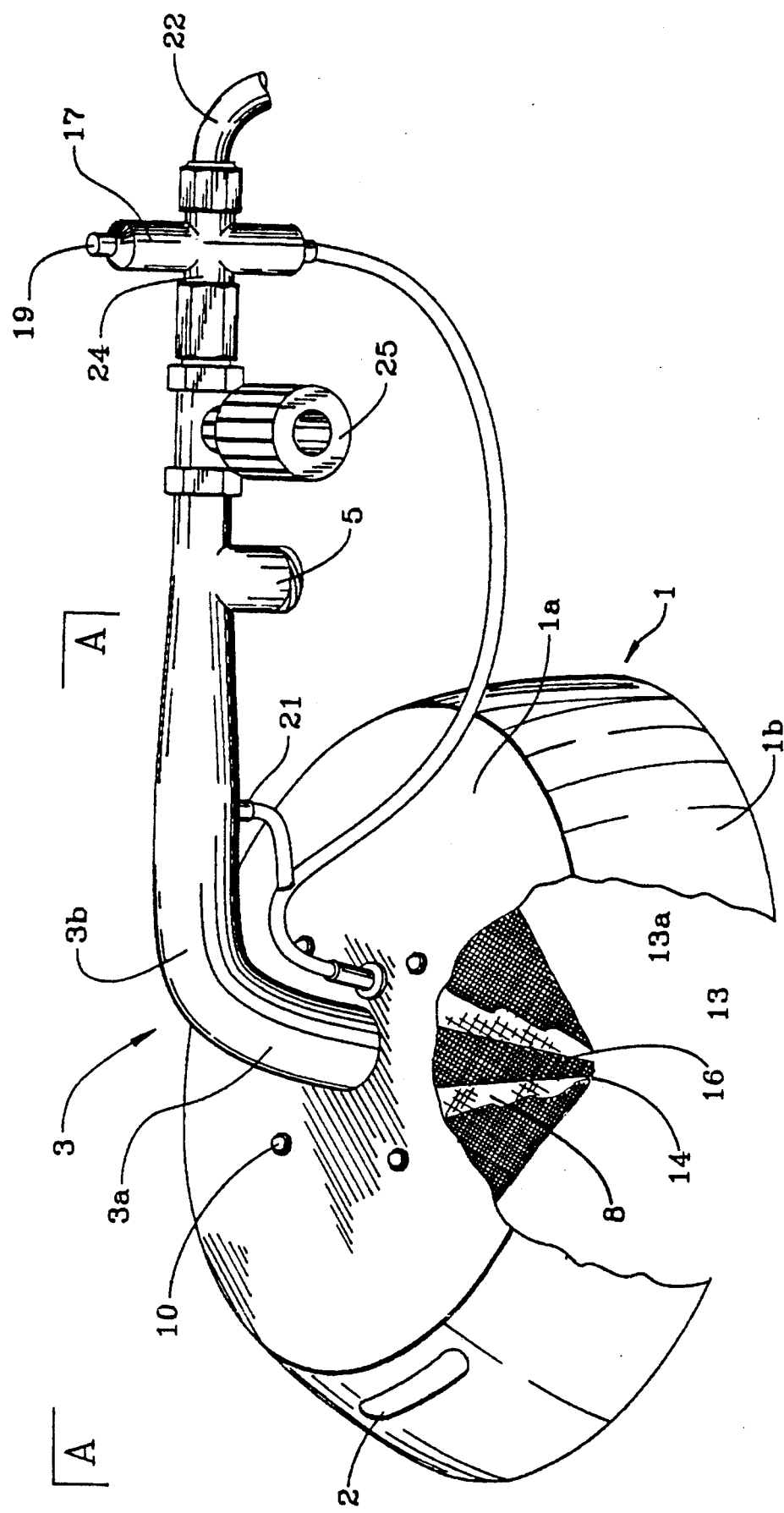
FIG. 1 is a perspective view with portions broken away for clarity, of a heating apparatus according to the invention.
Figure 2:
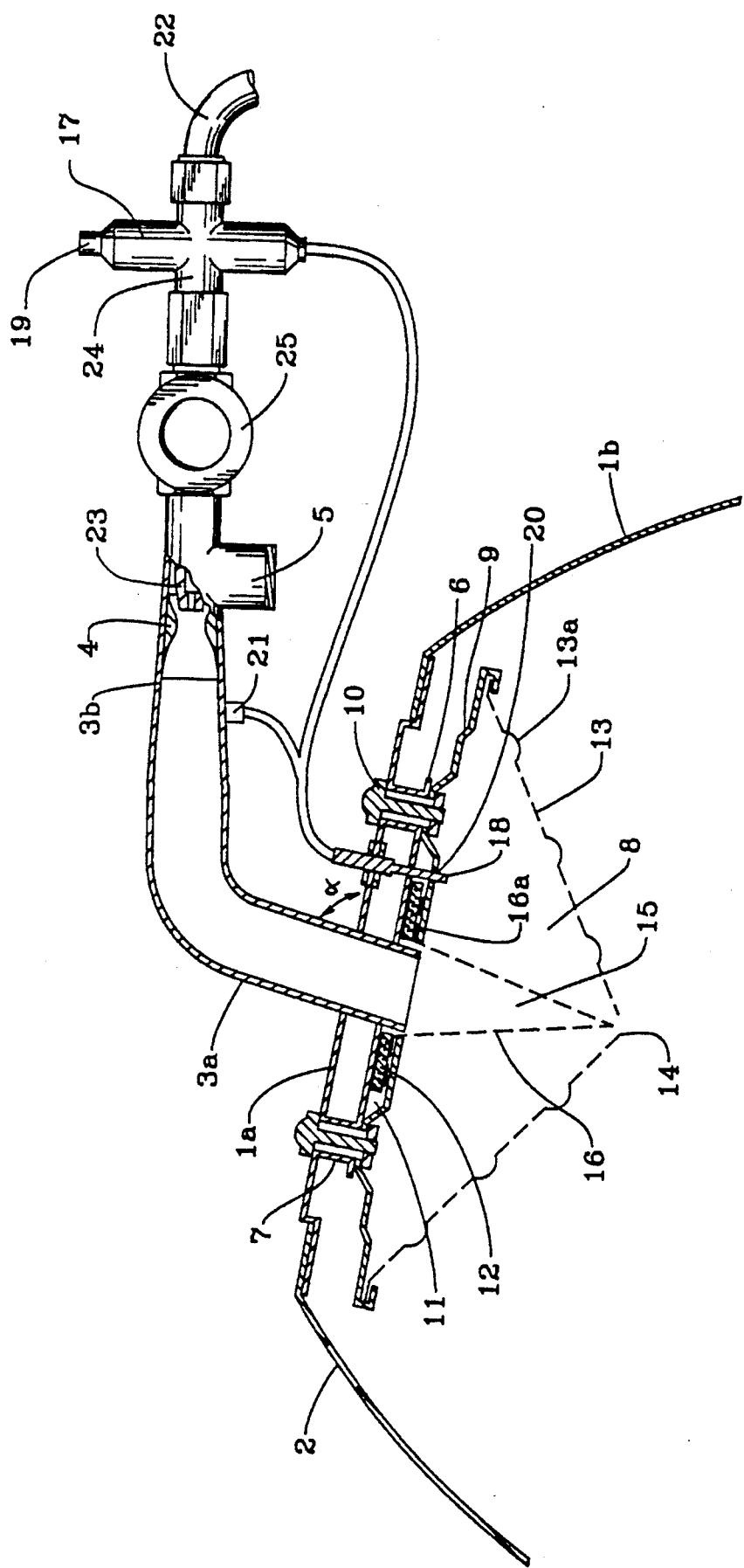
FIG. 2 is a side view, partially in longitudinal cross-section, of a first embodiment of a control valve for equipping a heating apparatus according to the invention.

The heating apparatus shown in FIGS. 1 and 2 is intended for the agricultural industry for the directionally downward heating of breeder buildings. This apparatus is designed to be fuel with gas, either individually be means of a bottle of a gas such as propane, or by means of a reservoir feeding a plurality of such devices in series. Natural gas or municipal gas will also work, but for operation over a wider range in variation of output level, it is desirable to have a minimum delivery pressure on the order of 150 mbar.

Figure 3:
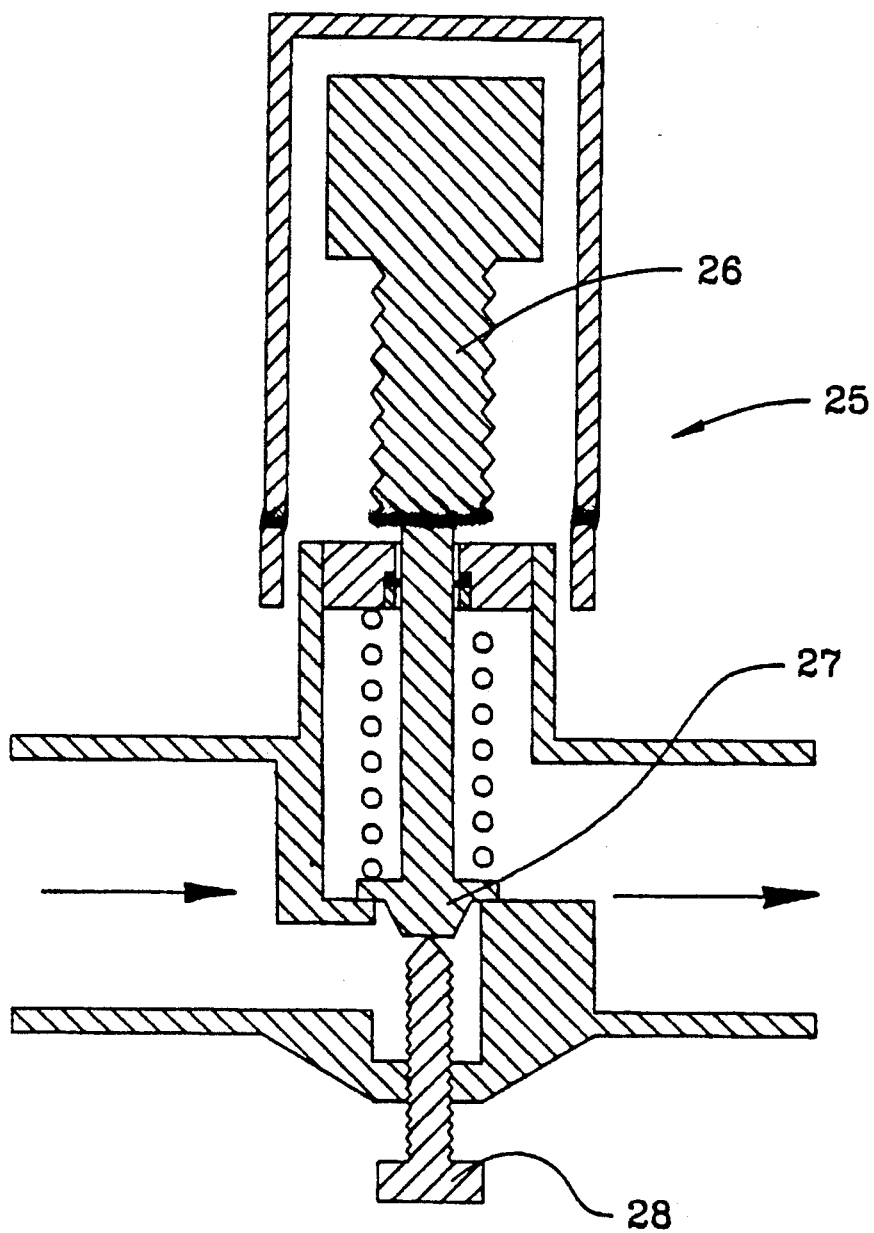
FIG. 3 is a longitudinal cross-section, on an enlarged scale, of a first embodiment of the control valve arranged to equip a heating apparatus according to the invention.
Figure 4:
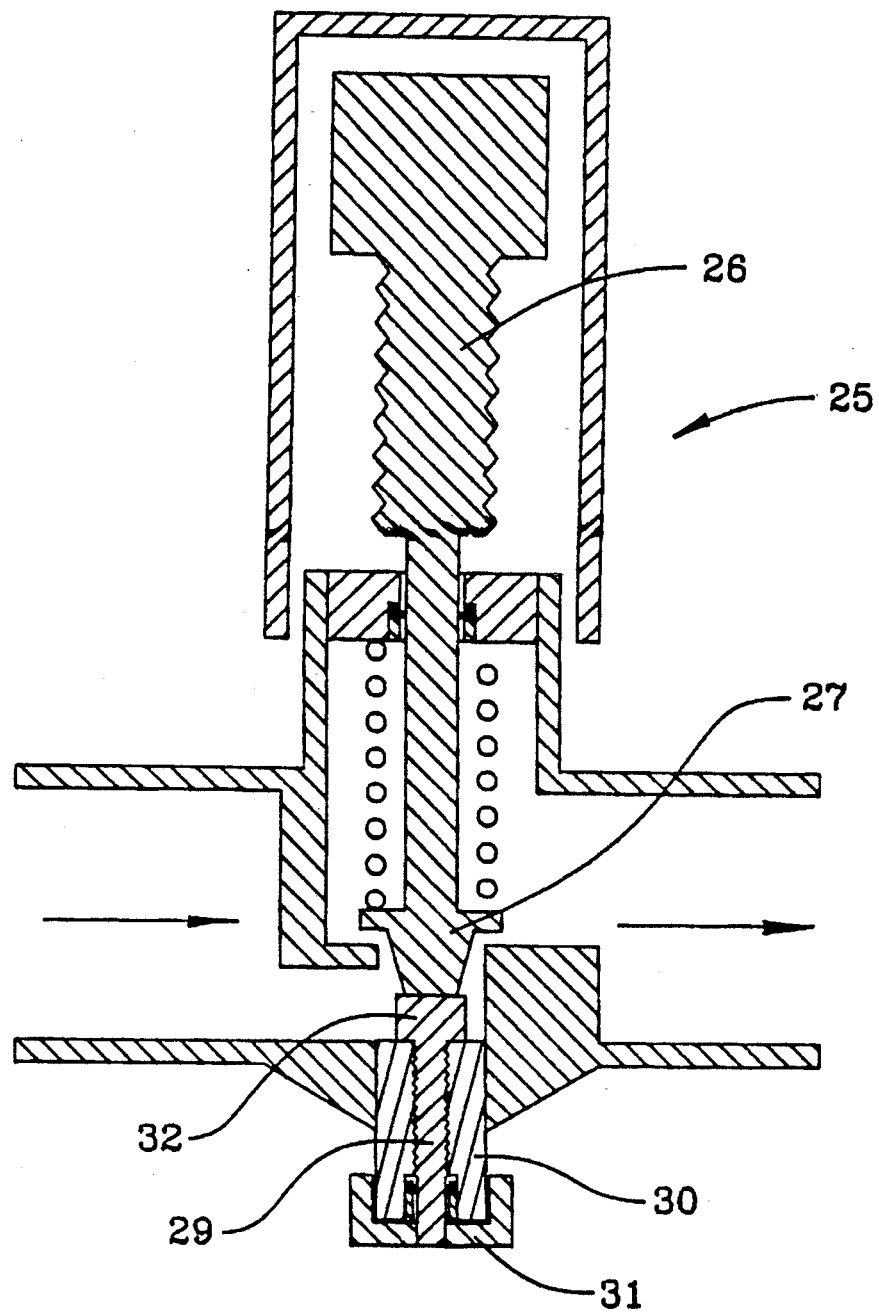
FIG. 4 is a longitudinal cross-section, on an enlarged scale, of a second embodiment of a controlled valve for equipping the heating apparatus.

The operation of this apparatus is controlled by means of a control valve such as is shown in FIGS. 3 and 4. This control may also be either individual, a control valve provided for each apparatus, or central with a control panel managing the operation of a battery of apparatuses, the control valve being then arranged on this panel.

Each apparatus comprises, firstly, a reflector 1 having the shape of a dome provided with a flat bottom 1a and a parabolic peripheral wall 1b. This dome 1 is intended to be suspended above the selected position by means of known support members (not shown), adapted to keep it inclined at an angle of 10 degrees with respect to the horizontal.

The peripheral wall 1b of this dome is also provided with an opening 2 arranged in proximity to the flat bottom 1a, and intended to be arranged in the upward position during operation of the apparatus in order to permit the evacuation of the gases consumed and the circulation of secondary air by convection.

Each apparatus comprises a conduit 3 for the feed of a gas/air mixture, on the end portion of which the flat bottom 1a of the dome 1 is secured by welding. This conduit 3 is provided, in a conventional manner, with a venturi element 4 and an inlet opening 5 for primary combustion air.

It has the shape of a 110° elbow pipe of which one of the arms 3a partially penetrates into the dome 1 through a central orifice provided in the flat bottom thereof forming an angle $\alpha$ of 80° with the flat bottom. This angle of 110° is particularly adapted in order that the second arm 3b of this pipe extends horizontally in the operating position of the apparatus.

On the interior of the dome 1, the apparatus comprises firstly a flange 6 secured to the periphery of the feed pipe 3 in such a manner as to extend parallel to the flat bottom 1a and to define therewith a circulation volume of air partially above the reflector.

This dome 1 also comprises diffusion members, combustion members and radiation members constituted by a primary combustion chamber and a air/gas mixture diffusion pre-chamber.

The primary combustion chamber 8 has a conical shape, pointed downwardly, and is arranged concentrically with respect to the pipe 3. It comprises a circular base wall 9 essentially planar, of a refractory material, provided with a central opening of a diameter greater than that of the pipe 3, for the passage of the end thereof. This base wall 9 is also shaped in such a manner as to have a circular rib by which it is secured to the flange 6.

This base wall 9 is secured to the bottom wall of the dome 1 by means of bolts 10 the screws of which extend through opposite bores provided in the bottom wall 1a, said base wall 9 at right angles with its rib, and the flange 6. Further, for each of the bolts 10, a tubular cross-member 7 is arranged between the end wall of the dome 1 and the flange 6 in order to avoid any deformation if this flange 6 and of the base wall 9 upon tightening.

Finally the flange 6 and the base wall 9, in the presence of the rib, define between them an internal volume 11 on the interior of which is compressed a gasket 12 of refractory fibers inserted over the periphery of the pipe 3.

The primary combustion chamber 8 comprises, further, a conical radiation wall 13 secured in a flexible manner to permit its expansion, at its base, about the periphery of the base wall 9. This conical wall 13, provided of heat resistant sheet metal perforated at 30% to 40% with circular holes of a diameter essential equal to 2 mm, having an angle at the top equal to 110°.

This conical wall 13 is shaped in such a manner as to have circular ribs 13a distributed over its height and intended to reinforce its rigidity when heated. The peak of this conical wall 13 is truncated in such a manner that the primary radiation chamber 8 has an orifice 14 at its bottom end.

The diffusion pre-chamber 15 is arranged on the interior of the primary combustion chamber 8 and arranged concentrically with respect to the pipe 3 in such a manner as to extend into the extension thereof.

It comprises a conical wall 16 adapted to become radiant, made of refractory sheet metal perforated to the extent of about 25% with circular holes of a diameter comprising essentially about 0.8 mm to 1 mm. This conical wall 16 also has an angle at its peak of 27.

This conical wall, the base of which has a diameter slightly greater than that of the pipe 3, is secured at the level of this base on the base wall 9 of the primary radiation chamber 8. To this end, it has, at the level of its base, a flat peripheral border 16a held clamped between the upper face of the base wall 9 and the gasket 12 compressed between this base wall 9 and the flange 6.

In the latter case, the height of the conical wall 16 is adapted such that its peak is even with the opening 14 of the primary combustion chamber.

Further, it should be noted that the flange 6 is fixed to the pipe 3, and the base wall 9 shaped in such a manner that the end of this pipe opens along a length on the order of 2 mm, to the interior of the diffusion pre-chamber 15. This arrangement seeks to eliminate, when extinguishing the apparatus, after use, any post-combustion effect of the final remaining gas/air mixture falling to zero pressure, on the interior of the pipe 3.

Associated with this apparatus is secured an assembly of members, including firstly a safety valve 17 with a thermoelectromagnetic winding for holding its closure in the open position. This valve 17 is associated with a thermocouple 18 as an interrupter, and is provided with a manual button 19 which permits causing manually the opening of its closure when placed in service.

The thermocouple 18 is secured to the dome 1 in such a manner that its element extends into the primary combustion chamber 8, in proximity to the bottom wall 9 and the base of the diffusion pre-chamber 15. For this reason, the flat bottom of the dome 1 is provided with a buttonhole opening at the level of which is secured the thermocouple 18. In the same manner, the flange 6 and the base wall 9 are also provided with openings 20 through with is introduced the thermocouple 18, these orifices 20 being of a diameter sufficient to permit a rapid cooling of the element in case of placing safety after extinguishment.

The thermocouple 18 is also associated with a high temperature thermostat 21 arranged on the horizontal arm 3b of the feed pipe. This thermostat 21 has a function of cutting the circuit intended to generate the closure of the safety vale 17 in case of abnormal raising of the temperature and internal lighting on the interior of the pipe 3, provoked by an accidental deterioration of the calibrated perforations of the conical wall 16 or of the gasket 12.

Further, and in a conventional manner, the inlet of the safety valve 17 is branched to a gas feed passageway 22, and the its output is connected to an injector 23 arranged at the level of the air inlet portion 5 of the feed pipe 3, by an injection conduit 24.

Lastly, each apparatus is provided with a control valve 25 which in the examples of FIGS. 1 and 2 is interposed in the gas injection conduit 24. This control valve comprises a thermostatic valve 25 comprising in a conventional manner an expansible fluid thermostatic capsule 26 acting on a valve body 27.

According to the invention, this thermostatic valve 25 has the peculiarity of being provided with a minimum opening device intended to prevent the complete closing of its valve member. As is shown in FIGS. 3 and 4, this apparatus may take exist in two versions: a minimum gas flow version chosen by the designer and not controllable (FIG. 3), and a variable minimum gas flow version, adjustable by the user (FIG. 4).

The arrangement of the thermostatic valve 25 shown in FIG. 3 comprises a screw 28 provided in the body of this valve, opposite the valve member 27 in such a manner as to prevent its complete closure and thus assure the passage of a minimum flow of gas. Additionally, in order to assure the sealing of the threads and the blocking of the position of the screw, once the control is established, the threads thereof are coated with a sealing and blocking product, assuring its definitive immobility with respect to the body of the valve 25.

The thermostatic valve device shown in FIG. 4 comprises a ring-screw 30 inserted into the body of the valve opposite the valve member 27, and on the interior of which is engaged a screw 29. This screw 29, provided with a conventional O-ring seal, comprises, at the level of its outer extremity, a serrated control knob 31 permitting manual control of its position, and as a result, to modify the minimum flow of gas.

At the point of its inner end, this screw 29 is also provided with a stop 32 adapted to limit the travel of the valve closure member 27 and assure, in the extreme downward position of the valve member, a minimum flow of gas.

The various members of the heating apparatus according to the invention having been thus described, its operation is described hereinafter.

The heating apparatus being assumed to be in a condition of completely extinguished, the lighting is achieved by placing a flame to the side of the orifice 14 of the primary diffusion chamber 8 and while actuating the manual button 19 of the safety valve 17. It should be noted that, due to the orifice 14, the lighting between the chamber 8 and the pre-chamber 15 is easily obtained even at a low level of operation, that is, with a low gas pressure.

The gas is then sent on by the injection conduit 24 toward the injector 23, and the gas/air mixture is projected into the primary combustion chamber 8, after diffusion by the pre-chamber 15, where the presence of the flame causes its combustion. The safety valve 17 is then kept open by the thermocouple 18 as long as combustion continues in the primary combustion chamber 8.

During operation, the appropriate heating level is obtained by variation of the flow of gas and, in the case shown in FIGS. 1 and 2, by means of the thermostatic valve 25 which controls the distribution of the gas to the injector 23. According to the level of heat directed, the characteristics of operation of the apparatus are as follows:

At high levels of heat, the un-ignited gas/air mixture is caused to be projected, by reasons of its flow velocity, to the exterior of the diffusion pre-chamber 15, through the perforations of the conical wall 16 of this chamber. This conical wall 16 assures, because of the angle at its peak, its total surface area and its perforations, with respect to the characteristics of the conical wall 13 of the primary combustion chamber 8, a well oriented dynamic projection which then enters combustion between the wall 16 of the diffusion pre-chamber 15 and the wall 13 of the combustion chamber 8. This latter is then heated to red heat state over its entire surface.

In effect, the respective shape of the two conical walls 13 and 16 cause a projection of the mixture according to an average of resultants orthogonal to the surface of the conical wall 13, resultants distributed over this surface. There is thus obtained on the ground an ideal radiation in the nature of concentric circles, the dome 1 contributing for its part to concentrate the radiation in the perimeter on the desired ground, as a function of its height of suspension.

The 110° elbow of the feed pipe 3 permits limiting to 80° the dead angle which defines with the base wall 9, the elbow branch 3a for introduction of the gas/air mixture into the diffusion pre-chamber 15. This has the effect of making negligible the depression created in this dead angle in the upper part of the diffusion pre-chamber 15 just above the extending end of the pipe 3, and in proximity with the end wall 9. For this reason, the pressure of the gas/air mixture in the entire volume of the diffusion pre-chamber 15 is essentially uniform and does not disturb the regularity of the reddening of the entire conical radiating wall 13 of the combustion chamber 8.

At low levels of operation, the forces projecting the combustion mixture decrease, this combustion is lower between the primary chamber 8 and the diffusion pre-chamber 15 and nears the conical wall 16 of the latter. In proportion as the infrared emission of the wall 13 of the primary chamber 8 decreases, that of the wall 16 increases. This wall 16 turns red and becomes the infrared and luminous emitter at low levels of operation.

The apparatus remains emissive of infrared radiation, even at low levels of operation, the respective shapes of the dome 1 and of the conical wall 16 permitting obtaining on the ground, an ideal radiation according to concentric circles. A mirror place on the ground below the apparatus permits observing the precise reflection by the dome of the red part of the spectrum emitted by the conical wall 16.

Finally, at decreasing levels of operation, the combustion of the gas/air mixture is always carried out on the exterior of the diffusion pre-chamber 15 but the lower portion of the surface of the conical wall 16 remains at a red state, over about 2 cm from the end of the point.

The presence of a luminous reference point protects the animals, in the case of certain species of poultry and wildfowl, against their gregarious behavior which forces them to become piled up on each other until suffocating a number of them, in the darkness. It should be noted that to this effect, the apparatus for minimum control of the thermostatic valve 25 permits controlling the decreasing level of operation, according to the species of animals, in such a manner as to obtain a more or less significant luminous source.

It should also be noted that at low diminishing levels of operation, the size of the circular perforations of the conical wall 16 of the diffusion pre-chamber 15, is a determining factor of the operation of the apparatus. In effect, at low and decreasing levels of operation, the combustion between the chamber 8 and the pre-chamber 15, very close to the conical wall 16, must not in any case communicate its flame with the not burning gas/air mixture on the interior of the pre-chamber 15, even if the diffusion pressure is at the minimum value for which the apparatus has been conceived. The size of the perforations is therefor limited to a maximum diameter adapted such that the wall 16 assures the anti-return operation of the flame to the interior of the pre-chamber 15 and prevents the start of combustion internal to the interior of the conduit 3. Thus, the perforations of a maximum diameter between 0.8 and 1 mm permit the apparatus to operate with a minimum pressure of 3 to 10 mbar according to the nominal pressure of operation.

For this reason, the apparatus may operate in complete safety without necessitating the conventional presence of an anti-flame return circular grill plate at the output of the branch 3a of the conduit 3.

This particularity offers an important advantage because the apparatus may operate without filtering the air for the four following reasons, inspite extremely high levels of dust in breeding (down, feathers, straw, shavings, flour, etc. . . . ).

In the first place, there if no need for a circular grill plate susceptible of becoming dirty in a "cold" zone of the apparatus, to assure the conduit 3 is ventilated by the unignited gas/air mixture.

Next, and for the three other of the reasons mentioned above, either at high levels of operation, at low levels, or at decreasing levels, the dust is pyrolized:

at high levels because all of the perforations of the wall 16 undergoing a plugging trial is no longer ventilated by the gas/air mixture passing therethrough, raises in temperature, and becomes red until the obstructing particle is destroyed almost instantaneously, a low level because the wall 16 is red hot over all of its surface, at diminishing levels because the low point of the wall 16 remains red and the little bit of dust aspirated at this decreasing level of operation is thus pyrolized.

Another important advantage flows from these four reasons the apparatus may be cleaned with water both internally and externally without danger of aggravated clogging requiring a complete disassembly.

In the last case, it should be noted that the arrangement of the plate 9 of the primary chamber 8 has two factors of interest: first, it assures both the thermal protection of the flat bottom of the dome and a circulation of burning gas and hot secondary air in the space that it defines with this bottom wall 1a, the evacuation of these gases and this air being carried out by the opening 2 of the dome 1; and secondly, it participates in the downward radiation of the radiant heat.

I claim:

1. A heating apparatus of the infrared type, particularly intended for the agricultural industry for directionally downward heating of breeder buildings, characterized in that it comprises in combination:
   a feed conduit (3) provided with an air inlet opening (5),
   a safety valve (17) provided with an inlet adapted to be connected to gas feed means (22) and an outlet connected to the feed conduit (3) by a gas injection conduit (24), said valve being provided with a member for keeping its valve member in an open position, a member acting as a temperature detector (18), and an opening member (19), in particular a manual button, permitting causing the opening of said valve member,
   a reflecting dome (1) provided with a gas/air mixture inlet opening, secured to said feed conduit (3) at an end thereof, and arranged essentially concentrically with respect to said conduit,
   a first chamber (8), called a primary combustion chamber having a conical shape pointed downwardly and arranged on the interior of the dome (1) essentially concentrically with respect to the latter, said chamber comprising a wall (9) called the base, fixed at the end of the feed conduit (3) and provided with a mixture inlet opening, and a conical wall (13) of a perforate conducting material, resistant to heat, provided with a base secured to the base wall (9),
   a second chamber (15) termed a diffusion pre-chamber, arranged in the primary combustion chamber (8) and comprising a wall (16) of a heat resistant material, perforated with holes having a maximum dimension of the opening of less than 1.5 mm, said wall having a conical shape, pointed downwardly, with an apex angle less that of the conical wall (13) of the primary chamber (8), and comprising a base of a diameter slightly greater than that of the feed conduit (3), secured to the refractory wall of the base (9) essentially concentrically with respect to this conduit (3),
   seal means (12) arranged at the level of the base of the conical wall (16) of the diffusion pre-chamber (15) and adapted to prevent all passage of the mixture in combustion in the primary combustion chamber (8) to the interior of said diffusion pre-chamber (15).

2. A heating apparatus as in claim 1, characterized in that:
   the feed conduit (3) has an end portion opening to the interior of the dome (1), in the diffusion pre-chamber (15),
   the base wall (9) comprises a refractory wall provided with a gas/air mixture inlet opening and secured to the end of the conduit (3) in such a manner as to define with the dome (1) a volume for circulation of burning gas and hot secondary air,
   the dome (1) is provided with an evacuation opening (2) for burning gases and hot air circulating in said volume.

3. A heating apparatus as in claim 2, characterized in that:
   the conical wall (16) of the diffusion pre-chamber (15) comprises a base provided with a flat peripheral flange (16a) adapted to rest on the base wall (9) on the periphery of the opening of the latter,
   a collar (6) is arranged in the dome (1) and soldered on the feed conduit (3), between said dome and the base wall (9) in such a manner as to define therewith an internal volume around the conduit (3),
   wherein said seal means comprises a gasket inserted in said internal volume on the periphery of the conduit (3), in such a manner as to be compressed between the collar (6) and the peripheral flange (16a) and the base wall (9).

4. A heating apparatus as in claim 1, characterized in that the dome (1) has a flat bottom (1a) and in that the feed conduit (3) has the shape of a 110° pipe elbow.

5. A heating apparatus as in claim 1, characterized in that the ratio between the apex angles of the conical walls (13, 16) respectively of the primary combustion chamber (8) and the diffusion pre-chamber (15) comprises essentially between 3.5 and 4.5, and said conical walls have essentially identical heights.

6. A heating apparatus as in claim 5, characterized in that the apex angle of the conical wall (13) of the primary combustion chamber (8) is essentially equal to 110° and the angle at the apex of the conical wall (16) of the diffusion prechamber (15) is essentially equal to 27°.

7. A heating apparatus as in claim 1, characterized in that the conical wall (16) of the diffusion pre-chamber (15) is perforated with circular holes of a diameter between 0.8 mm and 1 mm.

8. A heating apparatus as in claim 1, characterized in that the base (9) includes a refractory wall secured with respect to the feed conduit (3), in such a manner that a portion of the end of slight length, particularly on the order of 2 mm, extends into the diffusion pre-chamber (15).

9. A heating apparatus as in claim 1, characterized in that:
the conical wall (13) of the primary combustion chamber (8) has a truncated apex defining an orifice (14),
the conical wall (16) of the diffusion pre-chamber (15) has a height adapted to extend to the orifice (14) of the primary combustion chamber (8).

10. A heating apparatus as in claim 1, characterized in that the conical wall (13) of the primary radiation chamber (8) is shaped in such a manner as to have circular ribs (13a) distributed along its height.

11. A heating apparatus as in claim 1, characterized in that it comprises a high temperature thermostat (21) arranged on the feed conduit (3) and associated with the temperature detector (18) in such a manner as to cause the closing of the safety valve (17) in case of abnormally high temperature in said feed conduit.

12. A heating apparatus as in claim 1, and comprising a control valve for regulating the flow of gas constituted by a thermostatic valve (25) comprising a closure member (27), said apparatus being characterized in that said thermostatic valve comprises a minimum opening apparatus (28; 29-32) adapted to prevent the complete closing of the closure member (27) in such a manner as to assure the passage of a minimum flow of gas in the closed position of this valve (25).

13. A heating apparatus as in claim 12, characterized in that the minimum opening device comprises a screw (28; 29) arranged opposite the valve member (27) of the thermostatic valve (25) and adapted to serve as a stop member for said valve member before its complete closure.

* * * * *

UNITED STATES PATENT AND TRADEMARK OFFICE
CERTIFICATE OF CORRECTION

PATENT NO. : 5,060,629
DATED : Oct. 29, 1991
INVENTOR(S) : Joseph Sirand

It is certified that error appears in the above—identified patent and that said Letters Patent is hereby corrected as shown below:

Column 3, line 58, after "this" please insert:
--pre-chamber.

For this reason, the risks of combustion combustion within the interior of the diffusion pre-chamber are eliminated. This characteristic constitutes a determining factor for the operation of the apparatus. In effect, all combustion within the interior of the diffusion pre-chamber would lead to a rapid deterioration of the conical wall of this --.

Column 4, line 58, please change "fuel" to --fueled--.
Column 4, line 59, please change "be" to --by--.
Cclumn 5, line 55, please change "if" to --of--.
Column 6, line 59, please change "vale" to --valve--.
Column 6, line 66, please delete "the".
Column 7, line 11, please delete "take".

UNITED STATES PATENT AND TRADEMARK OFFICE
CERTIFICATE OF CORRECTION

PATENT NO.  :  5,060,629

DATED       :  Oct. 29, 1991

INVENTOR(S) :  Joseph Sirand

It is certified that error appears in the above-identified patent and that said Letters Patent is hereby corrected as shown below:

Column 8, line 42, please change "place" to --placed--.

Column 9, line 22, please change "if" to --is--.

Signed and Sealed this

Second Day of February, 1993

Attest:

STEPHEN G. KUNIN

Attesting Officer

Acting Commissioner of Patents and Trademarks